Nov. 12, 1968 T. R. DUNCAN ET AL 3,410,564

MINIATURE PHONOGRAPH

Filed July 27, 1965 3 Sheets-Sheet 1

INVENTORS
THEODORE R. DUNCAN
ROBERT N. ALESON
BY
Mason & Graham
ATTORNEYS

INVENTORS
THEODORE R. DUNCAN
ROBERT N. ALESON
BY
Mason & Graham
ATTORNEYS

INVENTORS
THEODORE R. DUNCAN
ROBERT N. ALESON
BY
Mason & Graham
ATTORNEYS

United States Patent Office 3,410,564
Patented Nov. 12, 1968

3,410,564

MINIATURE PHONOGRAPH

Theodore R. Duncan, North Hollywood, and Robert N. Aleson, Sylmar, Calif.; said Duncan assignor of one-quarter to T. Roger Duncan and one-quarter to Alan C. Duncan, both of Los Angeles, Calif.

Filed July 27, 1965, Ser. No. 475,056
5 Claims. (Cl. 274—1)

ABSTRACT OF THE DISCLOSURE

A miniature phonograph employing a self-coiling record spring of constant torque with sound grooves in one side thereof, a sound pickup needle carried by a pivoted tone arm and engageable with the record, a string for winding the record spring by uncoiling it from one drum onto another, the string being connected to the tone arm so that responsive to pulling of the string the tone arm is withdrawn from the record spring into engagement with a cam wheel which is also actuated by the winding string. The cam wheel moves the tone arm laterally of the record, and upon releasing the winding string, the tone arm is spring biased back into engagement with the record spring at a random lateral position thereon.

This invention has to do generally with talking mechanisms or phonographs of the mechanical type, and particularly with miniature phonograph devices suitable for incorporation in toys and other installations where only a small space is available.

An object of the invention is to provide a novel phonograph mechanism, miniature in size, which can be readily manufactured by present-day automatic and semi-automatic manufacturing and assembly techniques.

Another object is to provide a phonograph mechanism of extremely small size embodying several novel features and components which contribute toward and enable miniaturization of the entire unit.

Still another object is to provide a novel motive power means and in this connection it is an object to provide a phonograph mechanism embodying a novel record element which serves as its own motive power during the playing cycle. A further object in this respect is to utilize as the record element a strip of self-coiling spring having a construction such and used in a manner such that it has substantially constant torque during coiling.

Another object is to provide a novel record element in the form of a self-coiling metal spring having a coating material on one side thereof and record sound grooves formed in the coating.

A still further object is to provide a novel phonograph construction which lends itself to being incorporated in a toy or the like wherein all but a diaphragm portion of the device is mounted in one-half or one part of a casing or body, and the diaphragm is mounted in the other half or another part of the body. In this connection it is an object to provide a construction which may utilize integrally molded elements of the casing or body for supporting and mounting the various components of the phonograph.

Still another object is to provide a novel tone arm construction which serves to hold and support the needle or stylus and to amplify and transmit the vibrations thereof to the diaphragm.

A further object is to provide a phonograph device with a record element having a plurality of side-by-side record grooves any one of which may be "played" during the playing cycle and to provide novel means for causing the device to play a groove at random each time it is actuated.

A still further object is to provide novel means by which the needle is automatically retracted from the record element except during the playing cycle or part thereof. In this connection, another object is to provide novel means for causing the needle to move laterally of the record element during the winding cycle and subsequently to be released to enable it to engage any one of several sound record grooves in the record element at random.

These and other objects will be apparent from the drawings and the following description. Referring to the drawings.

Figure 1:
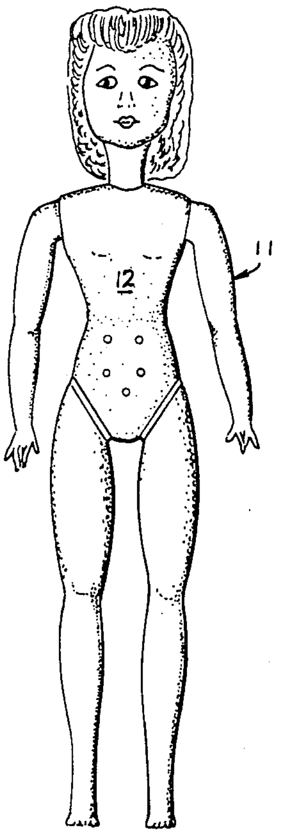
FIG. 1 is a front elevational view of a doll-type toy which has been choosen for illustration as a typical article in which the phonograph can be mounted.
Figure 2:
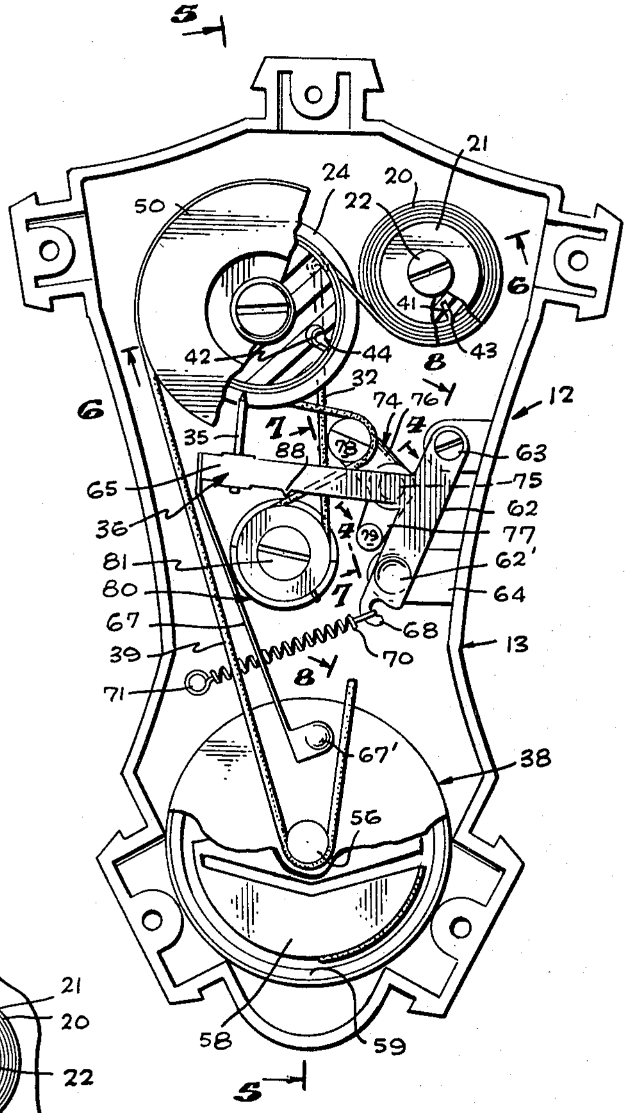
FIG. 2 is a view similar to FIG. 1, but on a larger scale, and showing only the torso or body of the doll with the front portion removed and the phonograph unit of the invention therein.
Figure 3:
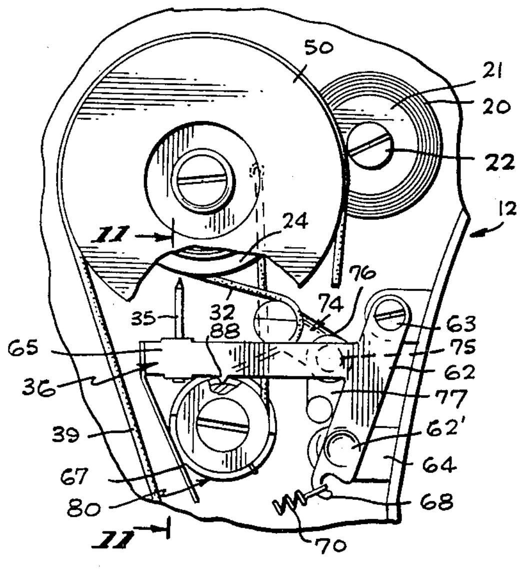
FIG. 3 is a fragmentary plan view of the tone arm and adjacent parts with the arm in fully retracted position.
Figure 4:
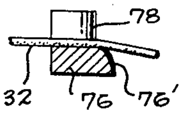
FIG. 4 is a fragmentary sectional view on line 4—4 of FIG. 2.
Figures 5, 6, 7, 8, 9, 10:
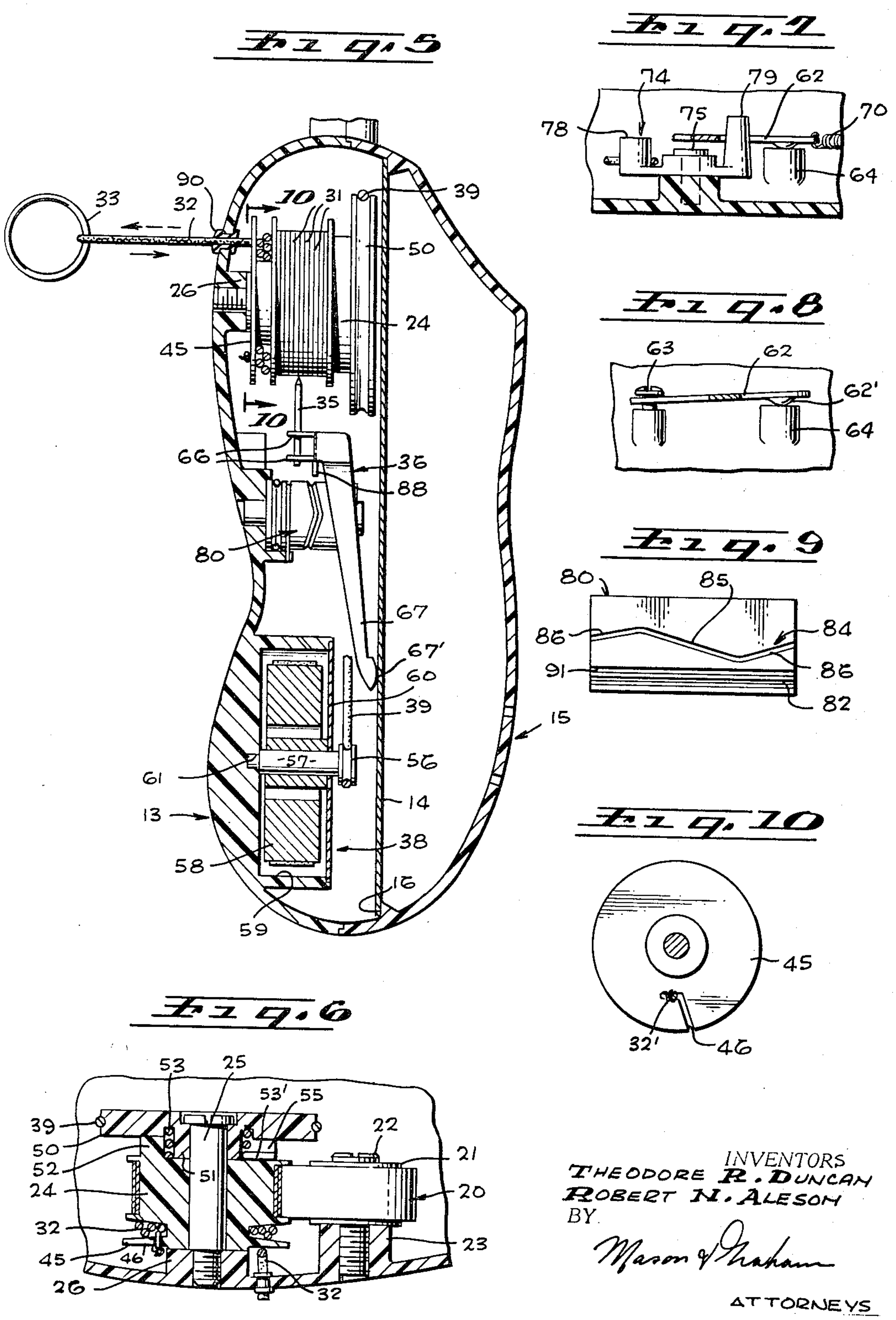
FIG. 5 is a sectional view on line 5—5 of FIG. 2.
FIG. 6 is a fragmentary sectional view on line 6—6 of FIG. 2.
Figure 11:
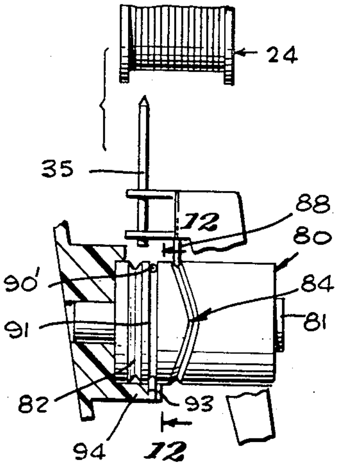
Figure 12:
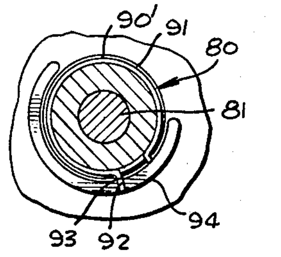
Figure 13:
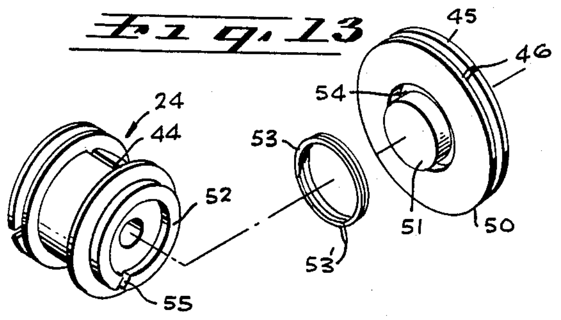
Figure 14:
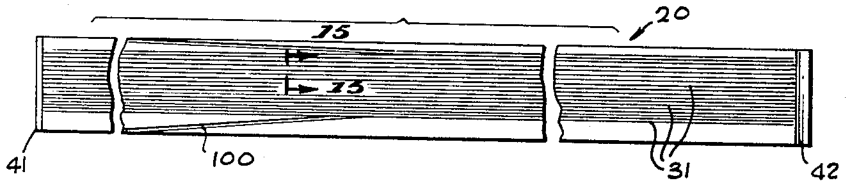
Figure 15:
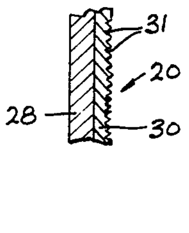

FIGS. 7 and 8 are fragmentary sectional views on lines 7—7 and 8—8, respectively, of FIG. 2;

FIG. 9 is a developed face view of the cam wheel;

FIG. 10 is a fragmentary sectional view on line 10—10 of FIG. 5;

FIG. 11 is a fragmentary sectional view on line 11—11 of FIG. 3, but on a larger scale;

FIG. 12 is a fragmentary sectional view on line 12—12 of FIG. 11;

FIG. 13 is an exploded isometric view of the main parts of the takeup drum assembly;

FIG. 14 is a fragmentary face view of the record element in extended flat form and on a larger scale; and FIG. 15 is a fragmentary cross-sectional view on line 15—15 of FIG. 14.

More particularly describing the invention, numeral 11 designates a doll toy which may be approximately twelve inches in height, and this includes a central body or torso 12 in which the phonograph unit of our invention is mounted. The body of the doll forms the case or casing for the phonograph, and while the case may be of a different configuration, the particular one shown illustrates the compact arrangement of the parts which is possible with the invention.

The case or body portion 12 has a main or rear section 13 in which all the elements of the phonograph unit are mounted with the exception of the diaphragm, designated 14. The latter is secured to the other or front section 15 of the casing, being cemented to a ledge 16 formed therein. The casing parts 13 and 15 may be joined in any conventional manner.

The phonograph unit itself includes an elongated record element 20 normally substantially wound around a small storage drum 21 which is mounted for rotation on a shaft 22 threaded into a boss 23 in the case. The record element extends reversely around and is attached to a takeup drum 24 mounted on a shaft 25 which is threaded into a boss 26. The record element consists essentially of a self-coiling metal spring 28 (FIGS. 14, 15) one side of which has a coating 30 in which a plurality of sound grooves 31 have been provided. As will later appear, a pullstring 32 with a finger ring 33 at its outer end is used to turn the takeup drum 24 and thereby wind the record element 20 onto the large drum from the small drum 21. When the string is released, the record element returns to the small drum through its self-coiling properties under substantially constant torque, and a stylus or needle 35 mounted in a tone arm 36 rides in a sound groove of the record element as the element unwinds from the large drum. In FIG. 5 the string is shown in an intermediate position as if it had been pulled and then released, and hence in FIGS. 2 and 5 the needle is shown in engagement with the record element. The tone arm transmits the vibrations of the needle to the diaphragm producing sound. The return movement of the record element is controlled by a governor 38 which is operably connected to the large drum by a belt 39.

The record element is attached to the drums by having its end portions 41 and 42 received in slots 43 and 44, respectively, of the drums 21 and 24, respectively. The record element has been described as a self-coiling spring and by this is meant an elongated strip of spring metal which has been given a set such that it tends to coil itself in tight coils upon the small drum 21. Such a spring normally is somewhat arcuate in cross section when not coiled. In the installation shown, since the curvature of the spring coming off the small drum is greater than the curvature as it comes off the large drum, the net force resulting will be in favor of the spring recoiling itself upon the small drum.

The takeup drum 24 is formed with a lower integral sheave section 45 around which the pullstring 32 is wrapped, the inner end of the string being secured to the drum by having it extend through a slit 46 and providing it with a knot 32' at its end.

A pulley 50 is rotatably mounted on the takeup drum as best seen in FIG. 13. The pulley has a central hub 51 which is received with substantial clearance in a cylindrical rib 52 on the takeup drum. A coil clutch spring 53 is positioned in the annular space between the hub 51 and the rib 52 and extends upwardly into an annular groove 54 in the pulley. An end 53' of the spring is anchored in a slot 55 in rib 52. The spring is so oriented that when the takeup drum turns clockwise during the playing cycle, the spring contracts about the hub 51 of the pulley, locking the parts together. When the drum turns in the opposite direction, the spring expands, leaving the parts relatively rotatable.

The pulley 50 is connected to a governor 55 by the belt 39 which passes around a grooved head 56 of the governor shaft 57. A rotor mass 58 is fixed to the shaft and is disposed in a cavity 59 in the casing part 12. The shaft 57 is journaled in a cover plate 60 and in a recess 61 in the casing. Thus, with the construction described the pulley 50 and governor shaft 57 do not turn when the drum 24 is turned counterclockwise to wind the record element thereon.

The tone arm 36, which may be made of sheet metal, includes a base 62 which is apertured at one end to receive a mounting screw 63. The other end of the base rests upon an abutment 64 formed in the case. The base is shown provided with a convex bearing area 62' on its undersurface for the purpose. With this construction the angle of the base with reference to the plane of the diaphragm 14 may be varied by adjustment of the screw 63, and, as will later appear, this affords means for adjusting the pressure of the tone arm against the diaphragm and thus controls the torsional stress of the tone arm.

Extending at an angle of about 19° from the base is an intermediate portion 65 of the tone arm, and this includes two downwardly extending parallel ears 66 in which the needle or stylus 35 is mounted. Beyond the main portion and extending therefrom at an angle of about 25° is a free arm portion 67 which terminates in a laterally projecting, upwardly dimpled, diaphragm-engaging end portion 67'. It will be noted that the plane of the arm portion is generally normal to the plane of intermediate portion 65 and base 62. The latter is provided with a hook 68 at one end to which is attached a coil tension spring 70, anchored at 71. The spring biases the tone arm clockwise to cause the needle to bear against the record element except when restrained by other forces as will appear.

It is an important feature of the invention that the needle only engages the record element during the playing cycle when the tension on the pullstring 32 is negligible. We provide means for accomplishing this and also for causing the tone arm to be oscillated laterally of the record element, when string 32 is pulled, in a manner such that the needle will return at random to one of the several sound grooves of the record element. This means includes a bell crank-type lever 74 which is pivotally mounted on a pin 75 in the base. The lever has a relatively short arm 76 and a somewhat longer arm 77, these being disposed at approximately 60°. The shorter arm has an integral, relatively short upright cylindrical post 78 at its end, while the other arm has a higher, thinner upright cylindrical post 79 at its end. The upper outer edge 76' of the arm 76 is beveled to provide a rounded surface for the pullstring 32 which rides thereon, as will later appear.

Lever 74 is so located that post 79 thereof is adjacent the inner edge of the base 60 of the tone arm. The other post is located nearer the drum 24 and has the pullstring wrapped partially around it, as best seen in FIGS. 2 and 3. From there the string is reversely looped around a cam wheel 80 rotatable on pin 81 and having a string-receiving groove 82. The cam wheel is provided with a cam groove 84 made up of angularly disposed alternate straight sections 85 and 86 (FIG. 9).

The purpose of the cam wheel 80 is to provide a means of achieving the random selection of the various sound record grooves in the record element by causing the tone arm and its needle to oscillate laterally of the record element during winding of the record element on takeup drum 24. To accomplish this, the tone arm is provided with a cam follower projection 88 which engages the cam wheel and ultimately enters the cam groove 84 therein. Due to the tension of the pullstring (except just after it has been pulled and released) the tone arm is normally slightly retracted so that the needle does not engage the record element. Although the needle is not retracted from the record element by pulling the string, the tone arm is retracted an additional distance to engage the cam wheel by pulling string 32, which passes freely through a grommet 90 in the case and from there beneath lever 74 and around the cam wheel, returning upon itself across the arm 76 and partially around post 78 of the lever 74 and then to and around the sheave portion 45 of the drum 24 to which its inner end is anchored. When the string is pulled, the tension thereof is sufficient to pivot lever 74 and thereby through its post 79 deflecting the base of the tone arm, pivot the tone arm until the cam follower 88 thereof engages the cam wheel and enters groove 84 thereof, causing the tone arm to oscillate laterally of the record element. When the string is released and only at that time, spring 70 returns the tone arm so that the needle engages the record element.

As previously indicated, the record element 20 comprises a self-coiling metal spring body 28 provided with a coating of a suitable plastic 30, such as a polyvinylchloride, bonded thereto and hardened in which we provide a plurality of separate or different, parallel sound record grooves 31. These grooves extend substantially from end to end of the record and each groove is designed to contain a complete message or selection. Lead-in grooves 100 for the two outermost grooves 31 may be provided at the portion of the record element near but spaced from end 41.

We have what we term a "progressive random repeat selectivity" system. This is dependent upon the length of the pullstring being noncommensurate with the circumference of the string receiving groove 82 in the cam wheel 80 and dependent upon the cam wheel not turning the same exact number of turns each time the string is pulled. If the string rotates the cam wheel the same number of times while being pulled or returning, whether commensurate or not, the device will tend to play the same message (record groove) over and over again. To prevent this from happening, we provide a clutch ring 90', in a groove 91 of the cam wheel, one end portion 92 being anchored in slit 93 in the string guard wall 94. The clutch ring prevents the cam wheel 80 from rotating to any considerable degree when the string is returning. Thus the string, when fully extended and completely released, will slip in the string groove 82.

When the string 32 is pulled, the pressure on lever 74 overcomes the tension of the coil spring 70 acting on the tone arm and permits the cam follower 86 of the tone arm to engage the cam groove 84, whereupon the tone arm "hovers" or oscillates laterally of the record element. The cam groove 84 which may be said to be zig-zag or triangular sine wave in that it travels in a straight line from zero degrees at the bottom of one side in a straight line to 180° on the opposite side, there being a minimal radius where the groove changes direction.

The necessity for a noncommensurate relation between the length of the string 32 and the circumference of the string groove 82, is that, if the cam wheel 80 is rotated an even number of turns such as twelve, the device will tend to play the same message over and over again; if the number of turns be twelve and a half, it will tend to repeat two messages alternately over and over again, but if the number of turns be noncommensurate, such as twelve and three-seventeenths, the device will tend to play all the different messages entirely at random, and as the relative position of the cam wheel 80 may appear to progress an odd fraction, such as three-seventeenths in either a clockwise or counterclockwise manner after each play, we term this "progressive random repeat selectivity."

It should be noted that the end portion 67 of the tone arm projects somewhat beyond the plane of the diaphragm 14 before the front portion of the case containing the diaphragm is attached to rear portion. Thus when the casing is assembled, the tone arm is stressed torsionally in the intermediate section 65. As previously pointed out, screw 63 provides a means of adjusting this torsion by varying the angle of the base 62 of the tone arm.

In the operation of the assembled device, in its normal, at rest position, the record element is wound upon the storage drum 21 except for approximately a turn or more which is wound about drum 24. The record element is exerting tension on the storage drum which is held against turning by the pullstring ring 33 abutting the case. The tension on the pullstring is sufficient to slightly raise the needle from the record element. When the pullstring 32 is pulled, the storage drum 24 is rotated and the record element is wound thereon except for a turn or more which remains on drum 21 due to limiting the length of the pullstring. As previously indicated, the pulley 50 and governor 39 do not turn an appreciable amount when the string is pulled. At the same time, the tone arm is retracted an additional distance by the pivoting of lever 74 under the influence of the string, post 78 abutting the base 62 of the tone arm to pivot it on screw 63. This causes the cam follower portion of the tone arm to engage the cam wheel 80 and enter the groove 84 therein. The string also rotates the cam wheel, and hence the tone arm oscillates laterally of the record element. When the pullstring is released, tension thereon is at a minimum allowing lever 74 to pivot clockwise under the influence of the tone arm which is biased by spring 70 so that the needle then engages one of the grooves 31 in the record element. The latter upon release of the string, recoils itself upon the storage drum and the needle traverses the groove. The return movement is controlled by governor 38.

Although we have illustrated and described a preferred form of our invention, we contemplate that various changes and modifications can be made therein without departing from the invention, the scope of which is indicated by the following claims.

We claim:

1. In a miniature phonograph, a support, a tone arm movably carried by said support, a needle mounted in said arm, an elongated record element mounted on said support for endwise movement past said needle and engageable thereby, said record element having a plurality of side-by-side sound record grooves therein, means for moving said record element in one direction, record element advancing means for moving said element in the opposite direction, means operable to retract said arm sufficient to cause said needle to disengage the record element, and means operable by said record element advancing means causing said tone arm, when retracted, to move laterally of the record element in the record groove area thereof during the advance of the record element, comprising a cam wheel driven by the record element advancing means and a lever engageable with said tone arm and actuated by said record element advancing means to cause said tone arm to engage said cam wheel.

2. The miniature phonograph set forth in claim 1 in which the record element advancing means includes a pullstring.

3. In a miniature phonograph, a support, first and second drums rotatably mounted on the support in laterally spaced relation, a self-coiling spring strip record element substantially coiled about said first drum and having an end portion fastened to said second drum, said record element having a set such that it coils itself in tight coils upon said first drum, said record element having a sound record groove extending longitudinally thereof in one side, said record element being so disposed on said drums that the grooved face is outermost on at least one of the drums, sound-reproducing means carried by said support and engageable with the groove of the record element opposite the drum on which the grooved face is outermost, winding means including a pull string for rotating said second drum in a direction to wind the record element therearound and unwind it from said first drum, said record element being inherently effective to return and rewind itself about said first drum when said second drum is free of the force of the winding means, means on said string limiting the return movement thereof, and intervening means operable in response to said pull string and the tension thereon from the pull of said record element at the end of its return movement to disengage said sound reproducing means from the record element.

4. In a miniature phonograph, a support, an elongated strip record element having a plurality of parallel sound grooves in a side thereof and extending longitudinally thereof, means for moving said record element longitudinally from its normal position including a drum to which the record is attached and a pullstring attached to and wrapped around the drum for rotating the same, means urging the return of the record element to its normal position, a tone arm pivotally mounted on the support and carrying a needle for engagement with the sound record grooves, said tone arm being sufficiently flexible that the portion thereof carrying the needle is capable of being moved laterally of the record element, a spring resiliently urging said tone arm about its pivotal axis in a direction to cause the needle to engage the record element, a lever pivotally mounted on said support and engageable with the tone arm, said string engaging said lever and being effective, when pulled, to pivot the lever in a direction to pivot the tone arm in a direction to move the needle away from the record element, and a cam wheel carried by said support in the path of pivotal movement of said tone arm in a direction away from said record element, said cam wheel carrying cam track means engageable by said tone arm and causing said tone arm to be moved laterally of the record element when engaged by the tone arm, said string extending around the cam wheel and rotating the same when the string is pulled.

5. The phonograph set forth in claim 4 in which said strong has means limiting its return movement and in which the means urging return of the record element places the string in sufficient tension at the end of its return movement to pivot the tone arm far enough to lift the needle from the record element.

References Cited

UNITED STATES PATENTS

| | | | |
|---|---|---|---|
| 936,976 | 10/1909 | Berliner | 274—42 |
| 2,212,623 | 8/1940 | Strauss | 274—1.1 |
| 2,238,412 | 4/1941 | Daniel | 274—11 |
| 2,622,700 | 12/1952 | Geyer | 185—37 |
| 3,030,115 | 4/1962 | Hardy et al. | 274—10 |

| | | | |
|---|---|---|---|
| 3,033,336 | 5/1962 | Kinsman | 192—415 |
| 3,073,605 | 1/1963 | Mennie | 274—1.1 |
| 3,162,980 | 12/1964 | Hellman | 274—1.1 X |
| 3,165,320 | 1/1965 | Ryan | 274—1.1 X |
| 3,285,612 | 11/1966 | Hallamore | 274—11.12 |
| 3,285,609 | 11/1966 | Hiller | 274—1.1 |
| 2,764,259 | 9/1956 | Foster | 185—37 |

FOREIGN PATENTS

| | | |
|---|---|---|
| 6,220 | 3/1906 | England. |
| 1,210,582 | 2/1966 | Germany. |

LEONARD FORMAN, *Primary Examiner.*

L. ANDERSON, *Assistant Examiner.*